Jan. 28, 1969  V. P. DONNER  3,424,196

FLOW REGULATING VALVE

Filed June 1, 1966

INVENTOR.
Verne P. Donner
By Ira Milton Jones
Attorney

United States Patent Office 3,424,196
Patented Jan. 28, 1969

3,424,196
FLOW REGULATING VALVE
Verne P. Donner, Palatine, Ill., assignor to Deltrol Corp., Bellwood, Ill., a corporation of Delaware
Filed June 1, 1966, Ser. No. 554,578
U.S. Cl. 137—504    6 Claims
Int. Cl. G05d 7/01

This invention relates to flow regulating valves and has more particular reference to improvements in regulating valves of the type which function to maintain a constant flow rate from the inlet to the outlet of the valve regardless of the total pressure drop across the valve.

In valves of this nature, the fluid to be controlled, usually air, is directed through an axial passage in a metering plunger having a restricted control orifice at its inlet end, and it had to pass through a metering orifice before it reached the outlet of the valve. In the event the rate of flow increased beyond a desired value, the plunger was caused to move in the direction of fluid flow through its axial passage, in response to the increased pressure drop resulting from fluid flow through its control orifice, to effect closure of the metering orifice an extent proportional to the increase in pressure drop.

Heretofore, flow control valves of this type were not only quite complicated, but were often incapable of accurately controlling the rate of flow of a fluid passing therethrough. Response of the metering plungers of such valves to impact forces imposed thereon by the incoming fluid was the most common cause of valve failure due to inaccurate control over rate of flow.

It is an object of this invention, therefore, to provide a flow regulating valve which is not only simple in construction but which is pressure compensated and very accurately controls the rate at which fluid flows through the valve.

Another object of the invention resides in the provision of a flow regulating valve which is readily externally adjustable so as to afford regulation of flow at any of a number of different rates.

Still another object of this invention resides in the provision of a regulating valve which functions to control rate of flow when fluid travels in one direction through the valve, but which provides for unrestricted travel of fluid therethrough in the opposite direction of flow without involving additional components to achieve that feature.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention, constructed according to the best mode so far devised for the practical application of the principles thereof, and in which.

Figure 1:
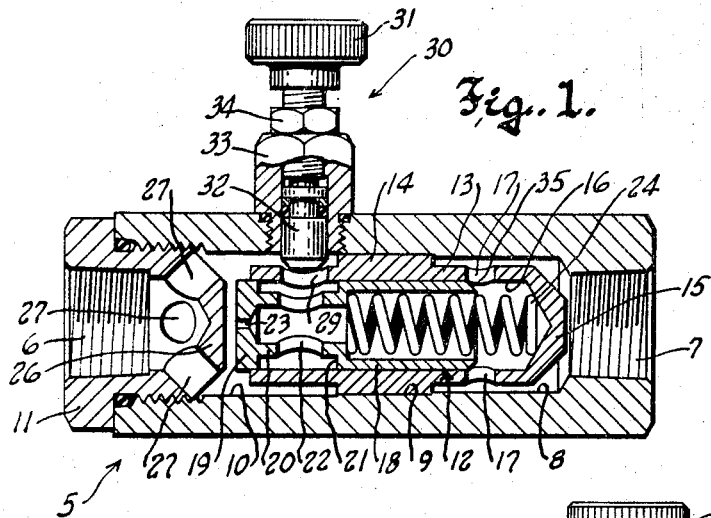
FIGURE 1 is a longitudinal sectional view of a flow regulating valve of this invention, showing the metering plunger thereof in its normal position.

Referring now to the accompanying drawing, the numeral 5 generally designates the body of the valve of this invention. The body is elongated and of tubular construction. It has an inlet 6 in its forward end, and an outlet 7 at its rear, both arranged on the axis of the tubular body.

The outlet 7 comprises an internally threaded port formed directly in the rear end of the body, and it opens forwardly into a first counterbore 8 which provides an outlet chamber in the body. The outlet chamber opens forwardly to a second counterbore 9 only slightly larger in diameter than the first, and the second counterbore in turn opens forwardly into a third counterbore 10. This last named counterbore extends all the way to the front of the body, and its mouth is internally threaded to receive an inlet fitting 11 of special construction to be described at greater length hereinafter. It is sufficient to here note that the inlet fitting has an internally threaded bore that provides the inlet port 6.

The valve is provided with an elongated pressure responsive metering plunger, generally designated 12, which is slidable axially in a sleeve 13 that is fixed in the valve body. The securement of the sleeve in the body is accomplished in an exceptionally simple manner. For this purpose, it is formed with a circumferential land or enlargement 14 medially of its ends and of a size to have a fluid-tight press fit in the medial counterbore 9. The rear axial end of this enlargement abuts the bottom of the counterbore 9, at its junction with the counterbore 8, to define the axial position of the sleeve in the interior of the body.

Hence, the sleeve can be assembled into the body from the front thereof, before securement of the inlet fitting 11 on the forward end of the body, and pressed rearwardly into the counterbore 9 until its enlargement 14 bottoms therein.

The rear end of the sleeve 13 is closed by an end wall 15, and it projects rearwardly from the enlargement 14 into the outlet chamber provided by the counterbore 8, with its exterior in radially spaced relation to the surrounding wall of the outlet chamber. The front portion of the sleeve is open and projects forwardly from the enlargement 14 into the counterbore 10 to be located in the inlet chamber provided by the latter, in the space rearwardly of the inlet fitting 11. The exterior of the front portion of the sleeve is also radially spaced from the surrounding wall of the counterbore 10.

The sleeve has a bore 16 of uniform diameter, in which the metering plunger 12 is axially slidably received, to normally occupy a position forwardly of one or more metering orifices 17 in its side wall, located immediately behind the rear end of a skirt 18 on the plunger. The skirt 18 is joined to a head 19 on the forward end of the plunger by a reduced tubular neck 20. The skirt and head, which are of the same diameter, have a sliding fit in the bore 16 of the sleeve, while the exterior of the neck is spaced radially from the wall of the sleeve bore, as shown, to in effect provide a circumferential groove 21 in the exterior of the plunger, of substantial axial length. One or more holes 22 in the wall of the neck 20 cooperate with the circumferential groove 21 to provide a bypass which will be described shortly.

The neck and the skirt cooperate to provide an axial passage through the plunger, which passage opens forwardly to the inlet chamber 10 through a control orifice 23.

In the normal position of the metering plunger seen in FIGURE 1, its head 19 is engaged in the bore in the front of the sleeve, and the rear of its skirt is forwardly of and in nonrestricting relation to the metering apertures 17 in the rear of the sleeve. This position of the plunger is defined by a coiled compression spring 24 confined in the rear of the sleeve and extending forwardly into the skirt on the plunger. The rear of the reduced neck 20 on the plunger is adapted to bear lightly upon the forward end of the spring 24, when the latter is in a relaxed state, to determine the normal position of the plunger.

Figure 2:
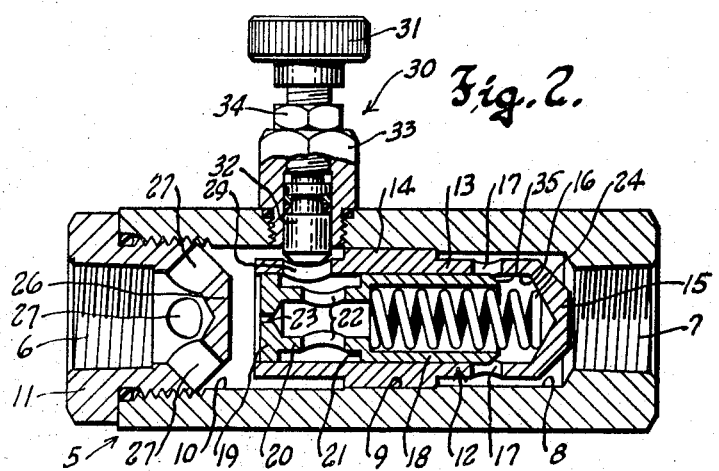
FIGURE 2 is a sectional view similar to FIGURE 1, but showing the plunger in a metering position.

From the description thus far, it will be apparent that fluid entering the inlet chamber 10 is constrained to flow through the control orifice 23 in the plunger head, from whence it travels through the axial passage in the plunger to the interior of the sleeve 13 at its rear. Fluid exits from the sleeve through the metering ports 17 in its side and flows into the outlet chamber 8, from whence it can discharge through the outlet 7. The spring 24 is calibrated to yield and permit the plunger to move rearwardly, in response to the pressure drop created by fluid flow through the control orifice 23, an extent proportional to the magnitude of the pressure drop. Such rearward motion of the plunger carries the rear end of its skirt into more or less restricting relationship to the metering ports 17 in the rear of the sleeve, as indicated in FIGURE 2. This, of course, varies the exhaust of fluid through the metering ports and achieves a compensating action by which a constant flow rate can be maintained from the inlet to the outlet of the valve. Since the spring 24 has a free length that defines the normal position of the plunger, regulated flow as described can take place without any preloading of the spring.

When all fluid flows to the axial passage in the plunger through the control orifice 23, the valve functions to maintain a constant minimum flow rate, without danger of undesired rearward response of the plunger to dynamic forces incidental to flow of fluid into the inlet chamber from the inlet fitting. The plunger is caused to respond solely to pressure in the inlet chamber. For this purpose the inlet fitting is formed with an end wall 26 that extends across its inner end, in confronting relation to the head 19 of the plunger, and with a series of outlet channels 27 that are arranged to direct incoming fluid rearwardly and divergently outwardly toward the wall of the inlet chamber to which they open, and away from the plunger head. Hence, the plunger is substantially isolated from impact forces which heretofore caused improper metering response thereof and made proper rate of flow control impossible.

Figure 3:
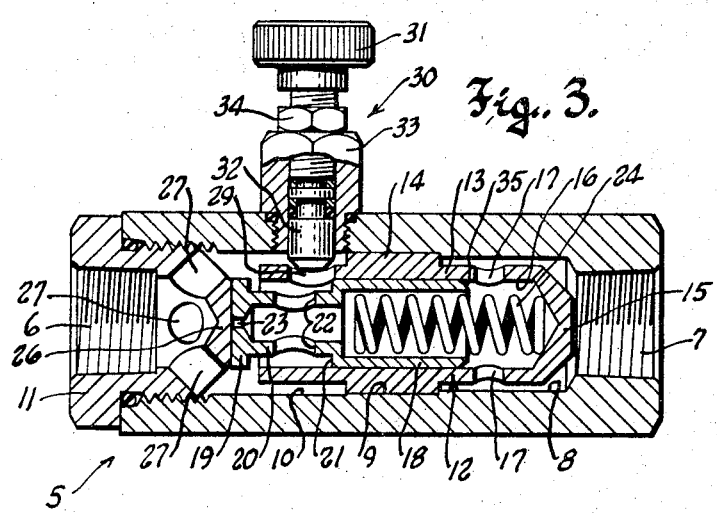
FIGURE 3 is a sectional view similar to FIGURE 1, but showing the plunger in the position it occupies during reverse flow of fluid through the valve.

The end wall 26 on the inlet fitting is spaced forwardly from the head on the plunger when the latter is in its normal position seen in FIGURE 1, and it provides a stop abutment with which the head is engageable when the plunger is moved forwardly to a free exhaust position seen in FIGURE 3, to define said exhaust position. The plunger is moved to this position by pressure fluid in the outlet chamber, acting upon its rearwardly facing surfaces, at times when the inlet chamber is vented. The stop or abutment 26 is so located as to limit forward motion of the plunger at a position where its head is spaced forwardly of the front end of the sleeve in which it slides, and at which the circumferential groove 21 in the exterior of the plunger is in communication with the inlet chamber through the then open front of the sleeve. Accordingly, fluid can flow substantially unrestrictedly in the reverse direction through the valve, namely from the outlet to its inlet.

One of the features of the flow regulating valve of this invention is that provision is made therein for adjustment of the rate of flow through the valve, so that it can function to maintain any of a number of different flow rates for which it is set. For this purpose, the forward end portion of the sleeve is provided with a bypass port 29 through which the inlet chamber can also be communicated with the axial passage in the plunger, in bypass relation to the control orifice 23 in its head. The bypass port 29 opens to the groove 21 in the exterior of the plunger, and cooperates with the groove and with the apertures 22 in the wall of the neck 20 to define a bypass passage which is effective whenever the bypass port is open. It is adapted to be closed and/or restricted to any desired degree by adjustable valve means generally designated 30, mounted on the exterior of the valve body and controlled by rotation of a knob 31.

The valve means 30 comprises a valve stem 32 which is operatively connected with the knob 31 and which projects through the side wall of the body in register with the bypass port 29 in the sleeve 13. The inner end of the stem engages in and closes the bypass port in an extreme inner position of the stem, and it opens the bypass port, as seen in the drawing, when the knob is rotated in a direction to back the stem out of the port 29.

The stem is slidingly mounted in a bonnet 33 which is screw threaded into a hole in the side of the valve body and has internal threads which are engaged by a threaded portion of the stem. O-rings suitably seal the connection between the bonnet and the body, and seal the stem in the interior of the bonnet.

As will be appreciated, the minimum flow rate maintained by the valve is established when the bypass port 29 is closed, and all fluid enters the axial passage in the plunger through the control orifice 23. The maximum flow rate maintained by the valve is established when the bypass port 29 is fully open. A range of intermediate flow rates can be maintained by restricting the bypass port 29 to a greater or lesser degree, as desired, by setting the axial position of the valve stem from the exterior of the valve body. The knob 31 enables this setting to be performed very conveniently, and a lock nut 34 holds the stem at the desired setting.

Since the inner end of the valve stem has a close slip fit in the bypass port 29, no damage can result to the sleeve in which the metering plunger is mounted, as a result of indiscriminate rotational adjustment of the knob 31. Inasmuch as the knob is arranged to bear upon the locknut 34 when the inner end of the valve stem 32 is fully engaged in the bypass port 29, the stem cannot be moved farther inwardly to cause possible damage to the neck on the plunger. Even when the stem fully closes the bypass port, it does not project into the groove 21 far enough to contact the neck on the metering plunger.

Another feature of the valve described is that the rear end of the plunger skirt 18 is beveled to provide a rearwardly convergent frusto-conical surface 35 at its exterior. This causes fluid to be funneled through the metering ports 17 while permitting the result of the dynamic flow forces to be damped. The operation of the valve is improved by this expedient, which enables very steady flow rates to be achieved.

From the foregoing description, together with the accompanying drawing, it will be readily apparent to those skilled in the art that this invention provides a flow regulating valve featuring simplicity, accurate control of any of a number of desired flow rates and substantially unrestricted reverse flow for exhaust purposes.

What is claimed as my invention is:
1. A flow regulating valve, comprising:
   (A) a tubular body having an inlet chamber in its front and an outlet chamber in its rear;
   (B) means in the body providing a sleeve having
      (1) an open end projecting forwardly into the inlet chamber,
      (2) a closed end projecting rearwardly into the outlet chamber,
      (3) and a metering port in its side, opening to the outlet chamber;
   (C) a pressure responsive plunger axially slidably mounted in the sleeve and normally occupying a position with its rear end forwardly adjacent to said metering port to progressively restrict the same as the plunger is moved rearwardly in the sleeve from its normal position;
   (D) passage means in the plunger normally cooperating with the metering port to afford limited communication between the inlet and outlet chambers, and comprising
      (1) a control port in the front of the plunger, opening to the inlet chamber,
      (2) an axial passage opening rearwardly into the closed end portion of the sleeve and communicating with the control port, said axial passage having a greater cross sectional area than the control port,
      (3) and a bypass port in its side, adjacent to the front of the plunger and communicating with said axial passage, said bypass port being closed by the forward end portion of the sleeve in the normal position of the plunger but being communicable with the inlet chamber at times when the plunger is moved out of its normal position to a forward position to thereby communicate the inlet and outlet chambers in bypass relation to said control port;

(E) means defining the normal position of the plunger, comprising a spring in the rear portion of the sleeve, said spring yieldingly resisting rearward motion of the plunger out of its normal position; and (F) means in the front of the tubular body having
  (1) an inner portion which projects rearwardly into the inlet chamber toward the front of the plunger and provides an abutment confronting but normally spaced from the plunger, and with which the plunger is engageable to define said forward position thereof,
  (2) an outwardly opening bore providing an inlet,
  (3) and channel means communicating said inlet with the inlet chamber at a location spaced from the surface of the abutment engaged by the plunger in the forward position thereof and remote from said control port.

2. The flow regulating valve of claim 1, wherein said bore is coaxial with the tubular body and with a bore in the rear thereof that opens into the outlet chamber.

3. The flow regulating valve of claim 1, further characterized by:
  (A) a second bypass port in the wall of the sleeve to communicate the inlet chamber with said first designated bypass port, and which provides for flow of fluid from the inlet chamber to the axial passage in the plunger so as to augment the flow of fluid thereto from the control port;
  (B) and adjustable valve means carried by the body and cooperable with said second bypass port to provide for flow of different fixed amounts of fluid therethrough to the axial passage in the plunger.

4. The flow regulating valve of claim 3, wherein said plunger is characterized by the following:
  (A) a head on its forward end normally engaged in the front end portion of the sleeve but movable out of the sleeve upon motion of the plunger to said forward position thereof, the head having said control port therein;
  (B) a skirt on the rear portion of the plunger slidingly engaging the interior surface of the sleeve and defining the rear portion of said axial passage;
  (C) a tubular neck coaxially connecting the head and the skirt, said neck providing the forward portion of said axial passage and being reduced in diameter to define a circumferential groove on the plunger of substantial length that registers with the second bypass port in all axial positions of the plunger;
  (D) and wherein said first designated bypass port comprises said groove and a hole in the wall of the neck opening to said groove.

5. The flow regulating valve of claim 1, further characterized by the following:
  (A) said sleeve having a circumferential enlargement on a medial portion thereof tightly frictionally engaged with the surrounding wall of the body to hold the sleeve in place therein with its opposite end portions spaced radially from the walls of the body surrounding the same and cooperating therewith to define portions of said inlet and outlet chambers;
  (B) said body having a forwardly facing abutment in its interior which is engaged by said medial enlargement on the sleeve to define the axial position thereof in the body, and having a counterbore forwardly of said enlargement on the sleeve opening to the forward end of the body to enable assembly of the sleeve in the body from the front thereof;
  (C) and said metering and second bypass ports being located in the end portions of the sleeves at axially opposite sides of its medial enlargement.

6. The flow regulating valve of claim 5, further characterized by an annular inlet fitting coaxially threaded into the forward end of the body, said fitting having
  (A) an abutment on its inner end opposing the forward end of the plunger and engageable thereby to define said forward position thereof;
  (B) and a plurality of outlet channels grouped around said abutment and arranged to direct fluid entering the fitting angularly outwardly and rearwardly into the inlet chamber and away from the adjacent forward end of the plunger.

References Cited

UNITED STATES PATENTS

| 2,198,487 | 4/1940 | Sisk | 137—504 |
| 3,015,341 | 1/1962 | Hedland et al. | 137—504 XR |
| 3,319,648 | 5/1967 | Donner | 137—504 |
| 3,339,580 | 9/1967 | Cutler et al. | 137—504 |

M. CARY NELSON, *Primary Examiner.*

ROBERT J. MILLER, *Assistant Examiner.*